United States Patent Office 3,657,264
Patented Apr. 18, 1972

3,657,264
HETEROCYCLICALLY SUBSTITUTED
THIADIAZOLES
Dietrich Rucker and Carl Metzger, Wuppertal-Elberfeld, and Ludwig Eue, Cologne, Germany, assignors to Farbenfabriken Bayer Aktiengesellschaft, Leverkusen, Germany
No Drawing. Filed Mar. 2, 1970, Ser. No. 15,836
Claims priority, application Germany, Mar. 4, 1969, P 19 10 895.3
Int. Cl. C07d 91/62, 99/10
U.S. Cl. 260—306.8 D          6 Claims

ABSTRACT OF THE DISCLOSURE

Heterocyclically substituted thiadiazoles, which possess herbicidal properties, and which may be produced by conventional methods.

---

The present invention relates to and has for its objects the provision for particular new heterocyclically substituted thiadiazoles, which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is known that thiazolylureas, for example N-(5-methyl-1,3-thiazolyl-2)-N'-methylurea, [i.e. compound (A) see Table 1] can be used as herbicides (cf. Belgian Pat. 679,138).

It has been found, in accordance with the present invention, that the particular new heterocyclically substituted thiadiazoles of the formula:

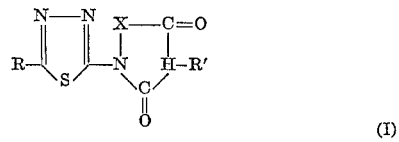

(I)

in which:

R stands for alkyl, haloalkyl, haloalkoxyalkyl, alkylmercapto, alkenylmercapto, alkinylmercapto, alkylsulfoxide or alkylsulfone each moiety of which can contain in the range of 1 to 5 carbon atoms, and preferably is methyl sulfonyl, methyl mercapto, trifluoromethyl or isopropyl, R' stands for alkyl of 1–4 carbon atoms, and X stands for carbonyl or sulfur, exhibit strong herbicidal, in particular selective herbicidal, properties.

The invention also provides a process for the production of a heterocyclically substituted thiadiazole derivative of the Formula I in which a 1-alkyl-3-(1,3,4-thiadiazolyl-5)-urea of the formula

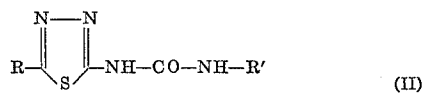

(II)

in which:

R and R' are the same as defined above is reacted with an acid chloride of the formula $$Cl—CO—X—Cl \quad (III)$$

in which
X is the same as defined above in the presence of a diluent.

Surprisingly, the heterocyclically substituted thiadiazole derivatives according to the invention show a higher herbicidal potency and, in particular, a higher selectivity than the prevously known thiazolylureas.

If 2-trifluoromethyl-1,3,4-thiadiazolyl-methylurea and oxalyl chloride are used as reactants, the reaction according to the invention can be represented by the following formula scheme:

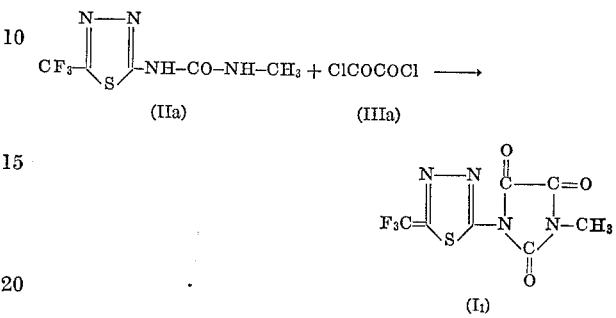

The starting materials of the Formula III above are already known. They are oxalyl chloride on the one hand, and chlorocarbonylsulfenic chloride on the other hand The starting materials of the Formula II above are not yet known, but they can be prepared according to the usual processes for the preparation of alkylureas, for example by reaction of 5-amino-1,3,4-thiadiazoles with alkylisocyanates in the presence of inert solvents, such as benzene or tetrahydrofuran, at temperatures of 10 to 100° C.

It is preferred that R stands for alkyl with 1–6 carbon atoms; haloalkyl with 1 or 2 carbon atoms and 1–5 halogen atoms, haloalkoxyalkyl with 1 or 2 carbon atoms in the alkoxy group, 1–5 halogen atoms, and 1 or 2 carbon atoms in the alkyl group; alkylmercapto with 1–4 carbon atoms; alkenylmercapto with 2–4 carbon atoms; alkinylmercapto with 2–4 carbon atoms; alkylsulfoxyl with 1–4 carbon atoms; or alkylsulfonyl with 1–4 carbon atoms; and R' stands for methyl, ethyl, propyl or iso-propyl. Any halogen atoms are preferably chlorine or fluorine. When R is haloalkyl it is most preferably trifluoromethyl.

Any inert organic solvent may be used as diluent. Such solvents include preferably hydrocarbons, such as benzene and toluene; chlorinated hydrocarbons, such as chlorobenzene; and ethers, such as dioxan and tetrahydrofuran; and the like.

The reaction temperatures can be varied within a fairly wide range. In general, the reaction is carried out at substantially between about 50–140° C., preferably between about 60–120° C.

Equimolar amounts of the reactants are generally used.

The working up of the reaction mixture is effected in customary manner.

The instant active compounds according to the present invention exhibit strong herbicidal properties and can therefore be used for the control of weeds. By weeds in the widest sense are meant all plants which grow in places where they are not desired. Whether the compounds according to the invention act as total or selective herbicides depends essentially on the amount applied.

The instant active compounds can be used e.g. in the case of the following plants: dicotyledons, such as mustard (Sinapis), cress (Lepidium), cleaver (Galium), common chickweed (Stellaria), mayweed (Matricaria), smallflower Galinsoga (Galinsoga), fathen (Chenopodium), stinging nettle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum); and the like.

The active compounds are particularly well suited for selective weed control in the cultivation of cereals and cotton.

The active compounds according to the instant invention can be utilized, if desired, in the form of the usual formulations or compositions with conventional pesticide diluents or extenders, i.e. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), ethers, ether-alcohols (e.g., glycol monomethyl ether, etc.), amines (e.g., ethanolamine, etc.), amides (e.g., dimethyl formamide, etc.), sulfoxides (e.g., dimethyl sulfoxide, etc.), ketones (e.g., acetone, etc., and/or water; as well as inert dispersible finely divided solid carriers, such as ground natural minerals (e.g., kaolins, alumina, silica, chalk, i.e., calcium carbonate, talc, kieselguhr, etc.), and ground synthetic minerals (e.g., highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.005–0.5%, preferably 0.008–0.1%, by weight of the mixture (i.e. especially in aqueous preparation form). Thus, the present invention contemplates over-all compositions which comprise mixtures of a conventional dispersible carrier vehicle such as (1) a dispersible inert finely divided carrier solid, and/or (2) a dispersible carrier liquid such as an inert oragnic solvent and/or water preferably including a surface-active amount of a carrier vehicle assistant, e.g. a surface-active agent, such as an emulsifying agent and/or a dispersing agent, and an amount of the active compound which is effective for the purpose in question and which is generally between about 0.005–95%, and preferably 0.008–95%, by weight of the mixture.

In particular, the amount of active compound per unit area varies according to the purpose intended and the mode of application. In general, substantially between about 0.1–15 kg. of active compound per hectare are applied, preferably between about 0.3–10 kg. per hectare.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

While the active compounds can be used according to the pre-emeregnce method, they are also particularly effective when used according to the post-emergence method.

Furthermore, the present invention contemplates methods of selectively killing, combating or controlling undesired plants, e.g. weeds and the like, which comprise applying to at least one of (a) such weeds and (b) their habitat, i.e. the locus to be protected, a herbicidally effective or toxic amount of the particular active compound of the invention alone or together with a carrier vehicle as noted above. The instant formulations or compositions are applied in the usual manner, for example by spraying, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, e.g. as total or only selective herbicidal effect, and the plants which are to be controlled or protected. Therefore, in special cases, it is possible to go above or below the aforementioned concentration ranges.

The following examples illustrate, without limitation, the herbicidal actvity of the particular active compounds of the present invention.

EXAMPLE 1

Pre-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Seeds of the test plants are sown in normal soil and, after 24 hours, watered with the given active compound preparation. It is expedient to keep constant the amount of water per unit area. The concentration of the active compound in the preparation is of no importance, only the amount of active compound applied per unit area being decisive. After three weeks, the degree of damage to the test plants is determined and characterized by the values 0–5, which have the following meaning:

0—No effect
1—Slight damage or delay in growth
2—Marked damage or inhibition of growth
3—Heavy damage and only deficient development or only 50% emerged
4—Plants partially destroyed after germination or only 25% emerged
5—Plants completely dead or not emerged.

The particular active compounds tested, the amounts applied and the results obtained can be seen from the following Table 1:

TABLE 1.—PRE-EMERGENCE TEST

| Active compound | | Active compound applied, kg./hectare | Echino-chloa | Cheno-podium | Stel-laria | Galin-soga | Matri-caria | Sina-pis | Oats | Cotton | Wheat |
|---|---|---|---|---|---|---|---|---|---|---|---|
| (A) | 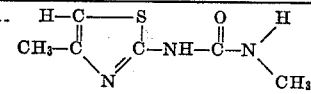 (known) | 5<br>2.5<br>1.25 | 3<br>2<br>1 | 4<br>2–3<br>1 | 4<br>2<br>2 | 4<br>3<br>2 | 4<br>4<br>3 | 2–3<br>1<br>0 | 2–3<br>0<br>0 | 1<br>0<br>0 | 3<br>1<br>0 |
| (1₁) | 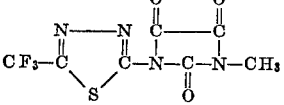 | 5<br>2.5<br>1.25 | 5<br>5<br>5 | 5<br>5<br>5 | 5<br>5<br>5 | 5<br>5<br>5 | 5<br>5<br>5 | 5<br>5<br>5 | 5<br>5<br>4–5 | 5<br>4–5<br>4 | 5<br>5<br>4–5 |

EXAMPLE 2

Post-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Test plants which have a height of about 5–15 cm. are sprayed with the preparation of the active compound such a way, that the amounts of active compound per unit area as given in the following table are used. Depending on the concentration of the spraying liquor the amount of water ranges from 1000–2000 l./ha. After three weeks, the degree of damage to the plants is determined and characterized by the values 0–5, which have the following meaning:

0—No effect
1—A few slightly burnt spots
2—Marked damage to leaves
3—Some leaves and parts of stalks partially dead
4—Plant partially destroyed
5—Plant completely dead.

The particular active compounds tested, their concentrations and the results obtained can be seen from the following Table 2:

The process for producing the particular new compounds of the present invention is illustrated wtihout limitation by the following further examples.

EXAMPLE 3

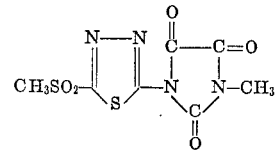

(2₁)

To 30 g. (0.127 mol) of 1-methyl-3-(2'-methylsulfonyl-1,3,4-thiadiazolyl-5')-urea suspended in 200 ml. of dry toluene there are added dropwise 16.3 g. (0.127 mol) of oxalyl chloride. Thereafter, heating is effected for 6 hours under reflux. After cooling, suction filtration is effected, followed by recrystallization from ethanol. The parabanic acid derivative melts at 254° C.

EXAMPLE 4

In manner analogous to that of Example 3, the parabanic acid derivatives of the general Formula I which are identified below are prepared.

| | R | R' | M.P., degrees |
|---|---|---|---|
| (1₄) | CF₃ | CH₃ | 253–4 |
| (3₁) | CH₃S | CH₃ | 166 |
| (4₁) | (CH₃)₂CH | CH₃ | 163 |

EXAMPLE 5

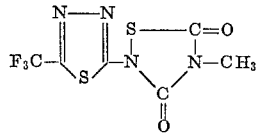

(5₁)

To 6.8 g. (0.03 mol) of 1-methyl-3-(2'-trifluoromethyl-1,3,4-thiadiazolyl-5')-urea suspended in 150 ml. of chlorobenzene there are added dropwise 4 g. (0.03 mol) of chlorocarbonyl-sulfenic chloride. Thereafter the temperature is kept at 70–80° C. for 3 hours. After concentration in a vacuum, the oily residue is recrystallized from a

TABLE 2.—POST-EMERGENCE TEST

| Active compound | | Active compound applied, kg./hectare | Echino-chloa | Cheno-podium | Sina-pis | Galin-soga | Stel-laria | Matri-caria | Dau-cus | Oats | Cotton | Wheat |
|---|---|---|---|---|---|---|---|---|---|---|---|---|
| (A) | 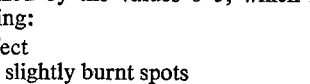 (known) | 2.5<br>1.25<br>0.6 | 3<br>1<br>0 | 4–5<br>4<br>2 | 4–5<br>4<br>3 | 4–5<br>3<br>2 | 3<br>2<br>1 | ——<br>——<br>—— | 1<br>0<br>0 | 1<br>0<br>0 | 2<br>0<br>0 | 1–2<br>0<br>0 |
| (1₃) | 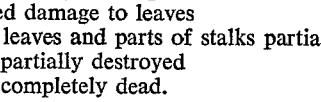 | 2.5<br>1.25<br>0.6 | 5<br>5<br>5 | 5<br>5<br>5 | 5<br>5<br>5 | 5<br>5<br>5 | 5<br>5<br>4 | 5<br>5<br>5 | 5<br>5<br>5 | 5<br>4<br>3 | 2<br>1<br>0 | 2<br>3<br>4 | benzene/petroleum ether mixture (1:3). The 4-methyl-2-(2' - trifluoromethyl - 1,3,4 - thiadiazolyl-5')-1,2,4-thiadiazolidinedione-3,5-melts at 119–120° C.

The 1-methyl-3-(2' - trifluoromethyl-1,3,4-thiadiazolyl-5')-urea used as starting material can be prepared according to known processes as follows:

To 16.9 g. (0.1 mol) of 5-trifluoromethyl - 2 - amino-1,3,4-thiadiazole in 100 ml. of tetrahydrofuran there are added dropwise at 20° C., with stirring, 5.7 g. (0.1 mol) of methyl isocyanate. After the evolution of heat has subsided, stirring is continued for a further 2 hours at 50° C., then the solvent is removed in a vacuum. After recrystallization of the solid residue from alcohol, the N-trifluoromethyl-1,3,4-thiadiazolyl)-N'-methylurea is obtained in crystalline form (M.P. 186° C.).

It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A heterocyclically substituted thiadiazole derivative of the formula:

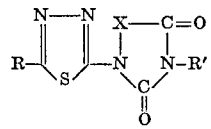

wherein:
R is selected from the group consisting of alkyl, haloalkyl, haloalkoxyalkyl, alkylmercapto, alkenylmercapto, alkinylmercapto, alkylsulfoxide or alkylsulfone, each moiety of which has 1 to 5 carbon atoms;

R' is an alkyl with 1–4 carbon atoms; and
X is selected from the group consisting of carbonyl and sulfur.

2. The compound of claim 1 wherein, with respect to said R, said haloalkyl has 1–2 carbon atoms and 1–5 halogen atoms; said haloalkoxyalkyl has 1–2 carbon atoms in the alkoxy group, 1–5 halogen atoms, and 1–2 carbon atoms in the alkyl group; said alkylmercapto has 1–4 carbon atoms; said alkenylmercapto has 2–4 carbon atoms; said alkinylmercapto has 2–4 carbon atoms, said alkyl sulfoxide is alkylsulfoxyl with 1–4 carbon atoms; and said alkylsulfone is alkyl sulfonyl with 1–4 carbon atoms; and R' is selected from the group consisting of methyl, ethyl, propyl and isopropyl.

3. The compound of claim 1 wherein:
R is selected from the group consisting of trifluoromethyl, methyl, sulfonyl, methylmercapto and isopropyl; and
R' is methyl.

4. The compound of the formula:

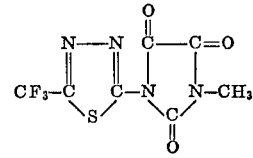

5. The compound of the formula:

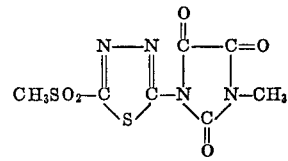

6. The compound of the formula:

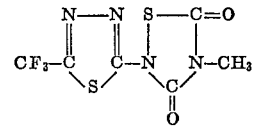

References Cited
UNITED STATES PATENTS
3,497,597   2/1970   Tomcufcik et al. __ 260—306.8 D ALEX MAZEL, Primary Examiner
R. J. GALLAGHER, Assistant Examiner